US 9,831,764 B2

(12) United States Patent
Bala et al.

(10) Patent No.: US 9,831,764 B2
(45) Date of Patent: Nov. 28, 2017

(54) SCALABLE PROTECTION VOLTAGE GENERATOR

(71) Applicant: STMicroelectronics International N.V., Schiphol (NL)

(72) Inventors: Phalguni Bala, Greater Noida (IN); Hiten Advani, New Delhi (IN)

(73) Assignee: STMICROELECTRONICS INTERNATIONAL N.V., Schiphol (NL)

( * ) Notice: Subject to any disclaimer, the term of this patent is extended or adjusted under 35 U.S.C. 154(b) by 437 days.

(21) Appl. No.: 14/549,458

(22) Filed: Nov. 20, 2014

(65) Prior Publication Data

US 2016/0149491 A1    May 26, 2016

(51) Int. Cl.
*H02M 3/06*    (2006.01)
*H02M 1/00*    (2006.01)

(52) U.S. Cl.
CPC ...... *H02M 3/06* (2013.01); *H02M 2001/0022* (2013.01)

(58) Field of Classification Search
CPC ... H02M 3/06; H02M 2001/0016; G05F 1/56; G05F 1/569; G05F 1/59; G05F 1/595
See application file for complete search history.

(56) References Cited

U.S. PATENT DOCUMENTS

| 3,622,899 | A | * | 11/1971 | Eisenberg | H03F 3/42 330/263 |
|---|---|---|---|---|---|
| 5,592,075 | A | * | 1/1997 | Heining | G05F 1/569 323/313 |
| 6,525,896 | B2 | * | 2/2003 | Chung | H03K 17/102 327/110 |
| 6,573,752 | B1 | * | 6/2003 | Killat | H03K 19/00315 326/63 |
| 6,617,906 | B1 | | 9/2003 | Hastings | |
| 6,703,813 | B1 | * | 3/2004 | Vladislav | G05F 1/575 323/270 |
| 6,894,467 | B2 | * | 5/2005 | Pons | G05F 3/242 323/273 |
| 6,989,660 | B2 | * | 1/2006 | Mauthe | G05F 1/465 323/274 |
| 7,026,802 | B2 | * | 4/2006 | Gradinariu | G05F 1/575 323/316 |

(Continued)

FOREIGN PATENT DOCUMENTS

| CN | 101329586 A | 12/2008 |
|---|---|---|
| CN | 205594492 U | 9/2016 |

(Continued)

*Primary Examiner* — Thomas J Hiltunen
(74) *Attorney, Agent, or Firm* — Slater Matsil, LLP

(57) ABSTRACT

According to an embodiment, a circuit includes a protection voltage generator coupled to a first voltage node, a second voltage node, and a ground voltage node, the protection voltage generator configured to generate a plurality of protection voltages at a first plurality of nodes based on the first voltage node and the second voltage node, and a voltage protection ladder coupled between the first voltage node and a low voltage circuit, the voltage protection ladder coupled to the plurality of protection voltages at the first plurality of nodes, the voltage protection ladder configured to generate a first low voltage based on the first voltage node and the plurality of protection voltages.

24 Claims, 9 Drawing Sheets

(56) References Cited

U.S. PATENT DOCUMENTS

| | | | | |
|---|---|---|---|---|
| 7,236,410 | B2* | 6/2007 | Schrom | G11C 17/18 365/189.11 |
| 8,362,803 | B2* | 1/2013 | Nicholas | H03K 3/356182 326/68 |
| 8,717,086 | B2 | 5/2014 | Grimm et al. | |
| 9,122,813 | B2* | 9/2015 | Oljaca | G06F 13/4081 |
| 9,304,527 | B1* | 4/2016 | Lipka | G05F 3/02 |
| 2005/0179421 | A1 | 8/2005 | Wang et al. | |
| 2008/0315855 | A1 | 12/2008 | Xiao et al. | |
| 2013/0229736 | A1* | 9/2013 | Van Der Borght | H02H 9/044 361/56 |
| 2016/0149491 | A1 | 5/2016 | Bala et al. | |

FOREIGN PATENT DOCUMENTS

| | | |
|---|---|---|
| KR | 20080020093 A | 3/2008 |
| WO | 9641247 | 12/1996 |

* cited by examiner

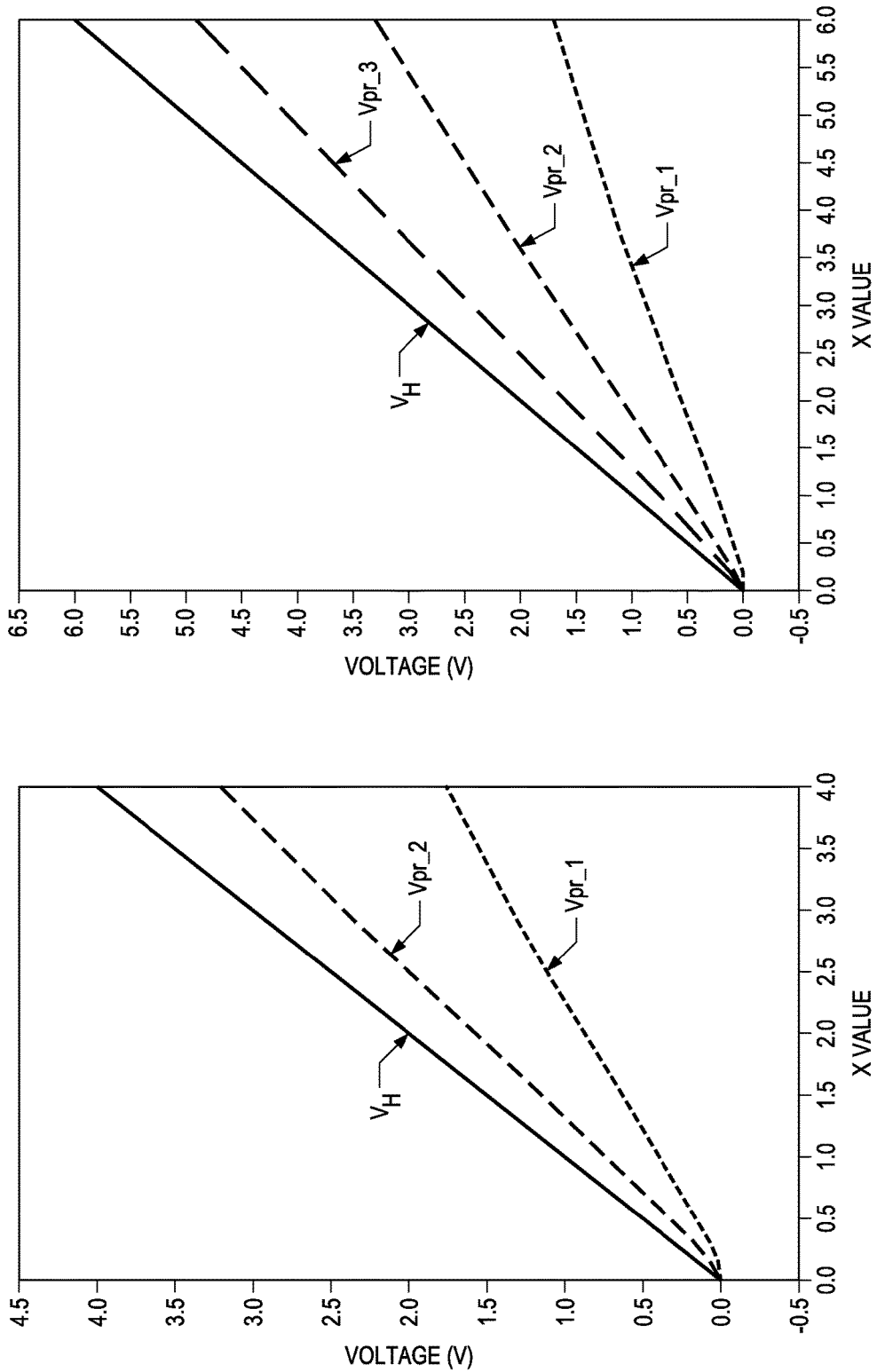

SCALABLE PROTECTION VOLTAGE GENERATOR

TECHNICAL FIELD

The present invention relates generally scalable protection voltage generation, and, in particular to a design for a protection voltage generation circuit and a voltage protection ladder to protect low voltage circuits and devices.

BACKGROUND

Most integrated circuits and devices are designed to operate using a specific voltage power supply, such as 5V±10%, that their internal process technologies are designed to tolerate. In modern integrated circuits and memories, the need for higher voltage power supplies is reduced as the process feature sizes, such as transistors, are reduced and operating speeds increase. However, in many situations the externally supplied high voltage is fixed by past usage, convention, or industry specification and is unable to be easily reduced to for the lower voltage tolerant process technologies.

Thus, there is a need in the art for a voltage reduction circuit and voltage regulator for low voltage process integrated circuits and devices.

SUMMARY OF THE INVENTION

An embodiment is a circuit including a protection voltage generator coupled to a first voltage node, a second voltage node, and a ground voltage node, the protection voltage generator configured to generate a plurality of protection voltages at a first plurality of nodes based on the first voltage node and the second voltage node, and a voltage protection ladder coupled between the first voltage node and a low voltage circuit, the voltage protection ladder coupled to the plurality of protection voltages at the first plurality of nodes, the voltage protection ladder configured to generate a first low voltage based on the first voltage node and the plurality of protection voltages.

Another embodiment is a circuit including a resistor ladder including M number of resistors serially coupled between a first power supply voltage and a ground voltage, a bias generator circuit comprising N number of bias voltage generators having inputs coupled to the resistor ladder, the bias voltage generators configured to generate N number of bias voltages at their outputs, wherein N−1 of the bias voltage generators have their output coupled to the input of another bias voltage generator, and a cascode ladder including N number of cascode devices serially coupled between the first power supply voltage and a low voltage device, each of the cascode devices being coupled to one of the bias voltages A further embodiment is a method including dividing a first supply voltage into a first set of voltages, generating a plurality of protection voltages, a first protection voltage of the plurality of protection voltages based on two of the first set of voltages and a second supply voltage, the other protection voltages of the plurality of the protection voltages each based on two of the first set of voltages and one of the other protection voltages of the plurality of protection voltages, and generating a first low voltage from the first supply voltage based on the plurality of protection voltages.

BRIEF DESCRIPTION OF THE DRAWINGS

For a more complete understanding of the present invention, and the advantages thereof, reference is now made to the following descriptions taken in conjunction with the accompanying drawings, in which:

FIGS. 6A, 6B, 6C, 6D, 6E, and 6F are examples of protection voltage generation in the voltage protection circuit in accordance with various embodiments.

DETAILED DESCRIPTION OF ILLUSTRATIVE EMBODIMENTS

The making and using of the present embodiments are discussed in detail below. It should be appreciated, however, that the present disclosure provides many applicable inventive concepts that can be embodied in a wide variety of specific contexts. The specific embodiments discussed are merely illustrative of specific ways to make and use the disclosed subject matter, and do not limit the scope of the different embodiments.

Embodiments will be described with respect to embodiments in a specific context, namely a voltage protection circuit and a method of operating a voltage protection circuit. Some of the various embodiments herein include a scalable voltage protection circuit for use in universal serial bus (USB) devices, high speed serial links, computers, or any system which can utilize high voltage signal handling using low voltage devices. In other embodiments, aspects may also be applied to other applications involving any type of voltage protection circuit according to any fashion known in the art.

In general terms, using embodiments of the present disclosure, devices can leverage a scheme to generate voltages to protect internal circuitry. In particular, the present disclosure utilizes one set of voltages to generate reference voltages to protect low voltage circuity from the one set of voltages. This allows for high voltage signal handling using low voltage capable devices, such as low voltage metal-oxide-semiconductor field-effect transistors (MOSFETs). In addition, this disclosure provides for supply independent high voltage protection for the low voltage circuitry.

Figure 1:
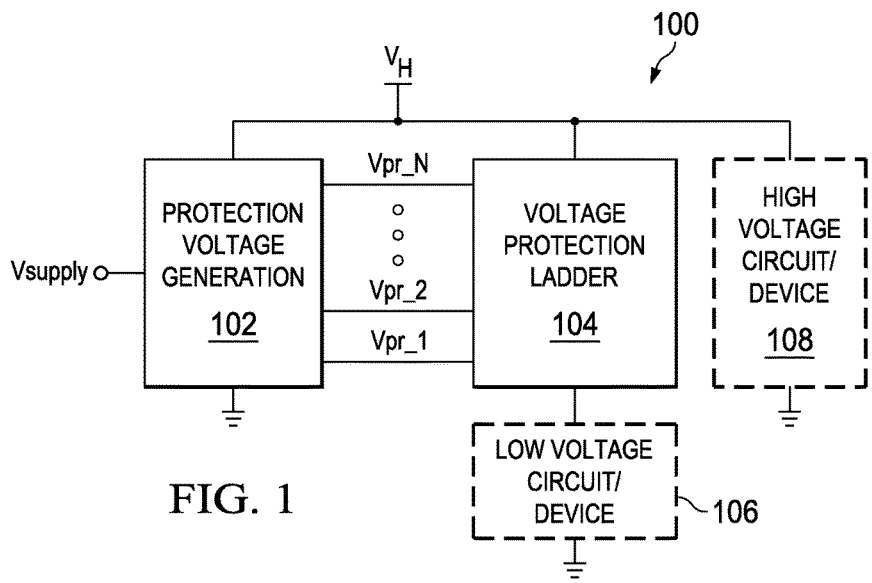
FIG. 1 is a block diagram of a voltage protection circuit in accordance with an embodiment.

FIG. 1 is a block diagram of a voltage protection circuit 100 in accordance with an embodiment. The voltage protection circuit 100 includes a protection voltage generation circuit 102, a voltage protection ladder 104, a low voltage circuit/device 106, and a high voltage circuit/device 108. The components and blocks of FIG. 1 are shown merely by way of illustration. Other voltage protection circuit implementations may contain more or fewer components/blocks. In particular, the embodiments of the present disclosure can be implemented with multiple voltage protection ladders, multiple low voltage circuits/devices, and multiple high voltage circuits/devices.

The protection voltage generation circuit 102 receives a supply voltage Vsupply and a high voltage $V_H$ and outputs a plurality of protection voltages Vpr_1, Vpr_2, and Vpr_N. The protection voltage generation circuit 102 is coupled to a low reference voltage (shown as ground in FIG. 1 although other low reference voltages may be used). The plurality of protection voltages are generated based on the supply voltage Vsupply and a high voltage $V_H$. In some embodiments, each of the protection voltages Vpr is generated by a different protection voltage stage within the protection voltage generation circuit 102. The number of protection voltages Vpr generated is scalable depending on the value of the high voltage $V_H$ and the maximum tolerable voltage of the components within the protection voltage generation circuit 102. The protection voltage generation circuit 102 is configured to automatically generate the plurality of protection voltages Vpr that are provided to the voltage protection ladder 104. In some embodiments, the voltage $V_H$ has multiple states in which it may be different values in each state. For example, in a normal state the voltage may be a high voltage signal, such as about 6 V, and in a low-power state the voltage $V_H$ may be a low voltage signal, such as from about 0 V to about 0.75 V. The protection voltage generation circuit 102 is configured to automatically provide the plurality of protection voltages at proper voltage values for all of the states of the voltage $V_H$.

The voltage protection ladder 104 is coupled between the high voltage VH and the low voltage circuit/device 106. The voltage protection ladder 104 receives the plurality of protection voltages from the protection voltage generation circuit 102. In some embodiments, the plurality of protection voltages are used to bias components of the voltage protection ladder 104 to enable the voltage protection ladder 104 to adjust the voltage $V_H$ to a lower voltage that is suitable for the low voltage circuit/device 106.

Figure 2:
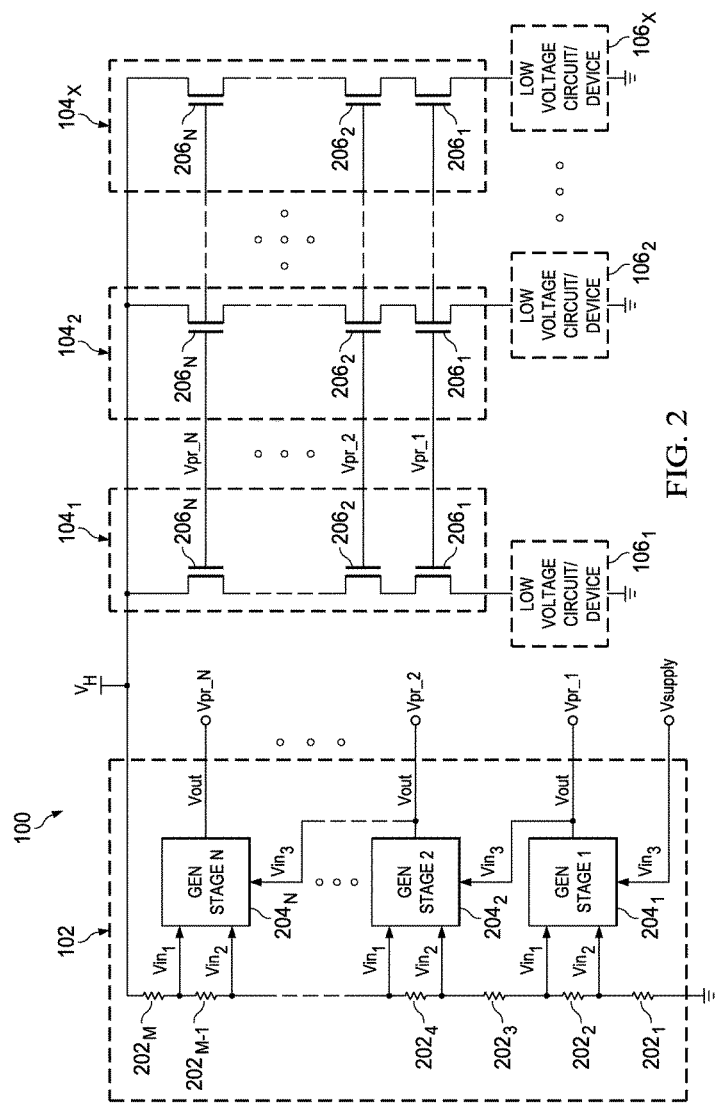
FIG. 2 is a schematic diagram of a voltage protection circuit in accordance with an embodiment.

FIG. 2 is a schematic diagram of a voltage protection circuit 100 in accordance with an embodiment. The voltage protection circuit 100 illustrated in FIG. 2 includes the protection voltage generation circuit 102, multiple voltage protection ladders 104 ($104_1$, $104_2$, and $104_X$), and multiple low voltage circuits/devices 106 ($106_1$, $106_2$, and $106_X$).

The protection voltage generation circuit 102 includes resistor ladder with M number of resistors 202 and N number of protection voltage generation stages 204 (Gen Stage 1, Gen Stage 2, and Gen Stage N). In an embodiment, M=2N+1. The resistors 202 are connected in series between high voltage $V_H$ and the low reference voltage. The high voltage node $V_H$ may be a power supply voltage $V_{DD}$ and the low voltage node may be a low reference voltage, such as ground or $V_{SS}$. In some embodiments, the resistors 202 may have different values depending on the design of the protection voltage generation circuit 102. In an embodiment, the resistor $202_1$ has a larger resistance value than any of the other resistors 202 in the resistor ladder. The resistor ladder has voltage taps that are input into the protection voltage generation stages 204.

The protection voltage generation stages 204 receive the inputs from the resistor ladder (Vin1 and Vin2) and another input (Vin3) from either Vsupply for protection voltage generation stage $204_1$ or from the output Vout of the previous protection voltage generation stage 204. The protection voltage generation stages 204 each generate outputs Vout that are coupled to the voltage protection ladder(s) 104 and also cascaded up through the protection voltage generation stages 204. For example, in the illustrated embodiment, the Vout of protection voltage generation stage 1 is cascaded to Vin3 of protection voltage generation stage 2, and the Vout of protection voltage generation stage 2 is cascaded to Vin3 of protection voltage generation stage N. By having the various voltage taps from the resistor ladder of resistors 202 and cascading the outputs of protection voltage generation stages 204 to the next protection voltage generation stage 204, the protection voltage generation stages 204 are able to generate protection voltages Vpr (Vpr_1, Vpr_2, and Vpr_N) of various voltage values based, at least partially, on the voltage VH and the voltage Vsupply. In some embodiments, the protection voltages should be generated to ensure that Vpr_N-Vpr_N-1 is less than or equal to the maximum rating of an NMOS transistor 206. The details of the protection voltage generation stages 204 will be discussed further below.

The voltage protection ladder(s) 104 (1041, 1042, and 104X) each include multiple MOSFETs 206 connected in series between the voltage VH and the low voltage circuit(s)/device(s) 106. In some embodiments, the MOSFETs 206 are n-type MOSFETs (NMOS) transistors 206. The NMOS transistors 206 of each of the voltage protection ladders 104 may be arranged in a cascode ladder (sometimes referred to as a cascode stack) configuration with the gates of the NMOS transistors 206 being coupled to and biased by the plurality of protection voltages Vpr from the protection voltage generation circuit 102. By forming the voltage protection ladder 104 as a cascode ladder of NMOS transistors 206, the NMOS transistors 206 can be low voltage devices but be able to safely drop the voltage $V_H$ to a voltage that is suitable to the low voltage circuits/devices 106.

In operation in a normal state, the voltage $V_H$ may be about 6 V and the voltage Vsupply may be about 1.8 V and the cascode ladder configurations of the NMOS transistors 206 can safely drop the voltage $V_H$ to about 1.8 V for the low voltage circuit/devices 106. In this state, the protection voltages Vpr increase in value from Vpr_1 to Vpr_N such that the protection voltage Vpr_N at the gate of the NMOS transistor 206N protects the transistor 206N from damage and allows the NMOS transistors 206N to safely drop the voltage at the source of the transistor 206N to a voltage of about Vpr_N–the threshold voltage of the NMOS transistor (VTN) 206N. The NMOS transistor 2062 has a drain voltage at the voltage Vpr_N–VTN, the gate voltage is Vpr_2, and the source voltage is at Vpr_2–VTN. The NMOS transistor 2061 has a drain voltage at the voltage Vpr_2–VTN, the gate voltage is Vpr_1, and the source voltage is at Vpr_1–VTN. Hence, the protection voltages Vpr allow the NMOS transistors 206 to safely drop the voltage VH without exceeding the maximum rating of any of the NMOS transistors 206 as each of the NMOS transistors 206 only has a fraction of the voltage drop across its drain and source terminals. A specific embodiment of a voltage protection circuit in a normal state with the voltage VH at about 6 V and the voltage Vsupply at about 1.8 V is described in further detail below in reference to FIG. 5A.

In operation in the normal state, the voltage $V_H$ may be about 6 V and the voltage Vsupply may be about 0 V, the protection voltages Vpr can still be provided as long as the input Vin2 of the protection voltage generation stage $204_1$ is greater than 0 V. Even with the voltage Vsupply absent (e.g. 0 V) the cascode ladder configurations of the NMOS transistors 206 can safely drop the voltage $V_H$ to about 1.8 V for the low voltage circuit/devices 106. In this state, the protection voltages Vpr increase in value from Vpr_1 to Vpr_N such that the protection voltage Vpr_N at the gate of the NMOS transistor $206_N$ protects the transistor $206_N$ from damage and allows the NMOS transistors $206_N$ to safely drop the voltage at the source of the transistor $206_N$ to a voltage of about Vpr_N–the threshold voltage of the NMOS transistor (VTN) $206_N$. The NMOS transistor 2062 has a drain voltage at the voltage Vpr_N–VTN, the gate voltage is Vpr_2, and the source voltage is at Vpr_2–VTN. The NMOS transistor 2061 has a drain voltage at the voltage Vpr_2−VTN, the gate voltage is Vpr_1, and the source voltage is at Vpr_1−VTN. Hence, the protection voltages Vpr allow the NMOS transistors 206 to safely drop the voltage $V_H$ without exceeding the maximum rating of any of the NMOS transistors 206 with or without the voltage Vsupply present. A specific embodiment of a voltage protection circuit in a normal state with the voltage $V_H$ at about 6 V and the voltage Vsupply at about 0 V is described in further detail below in reference to FIG. 5B.

In operation in a low power state, the voltage VH may be from about 0 V to about 0.75 V and the voltage Vsupply may be about 1.8 V. In this state, the protection voltage generation stages 204 are configured to propagate the voltage Vsupply to each of the protection voltages Vpr such that each of the protection voltages Vpr are substantially equal. Hence, in the low power state, the source and drain terminals of the NMOS transistors 206 of the cascode ladders can effectively be reversed if the low voltage circuits/devices 106 are providing a higher voltage than voltage $V_H$. A specific embodiment of a voltage protection circuit in a low power state with the voltage $V_H$ from about 0 V to about 0.75 V and the voltage Vsupply at about 1.8 V is described in further detail below in reference to FIG. 5C.

In some embodiments, the maximum rating for each of NMOS transistors 206 is about 1.98 V. In these embodiments, the voltage protection circuit 100 should be designed to ensure the VH−Vpr_N is less than or equal to 1.98 V, Vpr_N−Vpr_2 is less than or equal to 1.98 V, and Vpr_2−Vpr_1 is less than or equal to 1.98 V to stay at or under the maximum rating the NMOS transistors 206. Hence, Vpr_N−Vpr_N−1 is less than or equal to the maximum rating of an NMOS transistor 206.

The number N of the protection voltage generation stages 204 and the number N of the NMOS transistors 206 in each cascode ladder 104 may be determined based on the value of the voltage VH and the desired voltage to be provided at the low voltage circuit/devices 106. The minimum value for N may be described by the equation below:

N(min)=((Maximum $V_H$ voltage)/(Maximum voltage rating of devices))−1

For example, if the maximum $V_H$ voltage is about 6 V and maximum voltage rating of the devices is about 1.98 V, the minimum number N of stages and transistors in cascode ladders is equal to about 2.03. However, because it is not feasible to have a portion (e.g. 0.03) of a stage and/or transistor, the value should be rounded up to 3. Hence, with three stages 204 and three transistors in each of the cascode ladders 104, the voltage $V_H$ can be safely dropped to a voltage appropriate for the low voltage circuits/devices 106.

As illustrated in FIG. 2, the number X of cascode ladders 104 and low voltage circuit/devices 106 can be any suitable number such as 1, 2, 3, 10, more than 10, etc. In addition, the voltage protection circuit 100 can have any number of high voltage circuits/devices 108 (see FIG. 1). Thus, the voltage protection circuit 100 is scalable, modular, and tunable as it can be designed to accommodate any voltage $V_H$, any maximum voltage rating of the low voltage devices, and also any number of high voltage circuits/devices 108 and low voltage circuits/devices 106.

Figure 3A:
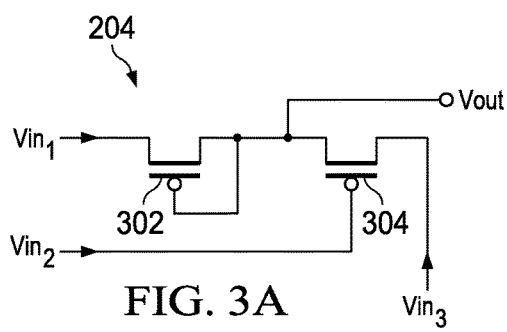
FIGS. 3A, 3B, and 3C are schematic diagrams of portions the voltage protection circuit in accordance with various embodiments.
Figure 3B:
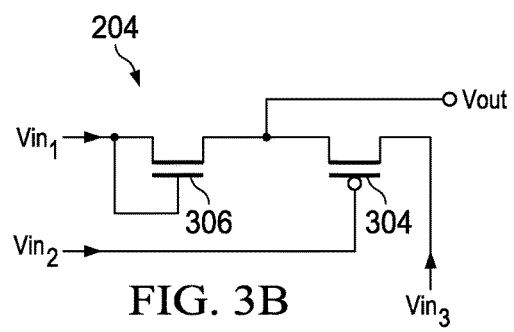
Figure 3C:
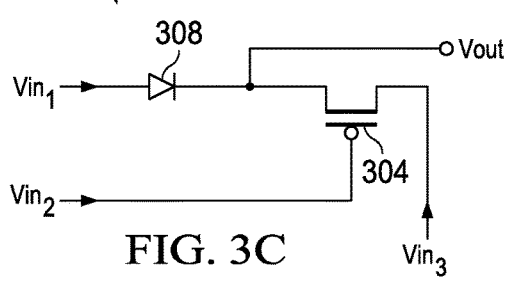

FIGS. 3A, 3B, and 3C are schematic diagrams of the protection voltage generation stages 204 in accordance with various embodiments. The embodiment in FIG. 3A includes p-type MOSFETS (PMOS) transistors 302 and 304 connected in series between the inputs Vin1 and Vin3 of the protection voltage generation stage 204. The input Vin2 is coupled to the gate of the PMOS transistor 304 and the output Vout is coupled to the node between the PMOS transistors 302 and 304. The PMOS transistor 302 has its gate coupled to its drain (sometimes referred to as a diode connected PMOS transistor configuration).

The embodiment in FIG. 3B is similar to the embodiment in FIG. 3A except that the diode connected PMOS transistor 302 has been replaced by a diode connected NMOS transistor 306. The NMOS transistor 306 has its gate coupled to its source, which effectively forms a diode.

FIG. 3C is similar to the embodiments in FIGS. 3A and 3B except that the diode connected transistors (302 and 306) are replaced with their representative component of a diode 308.

In operation, each of the embodiments in FIGS. 3A-C function similarly by coupling the output Vout to either Vin1 or Vin3 based on the relationship between inputs Vin2 and Vin3. For example, in a first operation mode, the voltage at Vin2 is greater than the voltage at Vin3, and thus, the transistor 304 remains in an OFF state up to a source voltage of Vin2+VTP (the threshold voltage of the PMOS transistor 304), whereas, beyond that source voltage the transistor 304 is in an ON state. Hence, the voltage Vin1 is designed to be: less than Vin2+VTP+VTP for the embodiment in FIG. 3A, less than Vin2+VTP+VTN for the embodiment in FIG. 3B, and less than Vin2+VTP+diode cut-in voltage of diode 308 in FIG. 3C. This allows the output Vout to be equal to the voltage at Vin1 minus the threshold voltage drop (e.g. diode drop) across the transistor 302 or 306. In a second operation mode, the voltage at Vin2 is less than the voltage at Vin3 by more than the threshold voltage of the PMOS transistor 304 (VTP), and thus, the transistor 304 is in an ON state. This allows the output Vout to be equal to the voltage at Vin3.

The embodiments of the protection voltage generation stages 204 in FIGS. 3A-C are merely illustrative embodiments and are not meant to be limiting. Any configuration of a protection voltage generation stage 204 that operates in a manner as described above is within the scope of the present disclosure.

Figure 4:
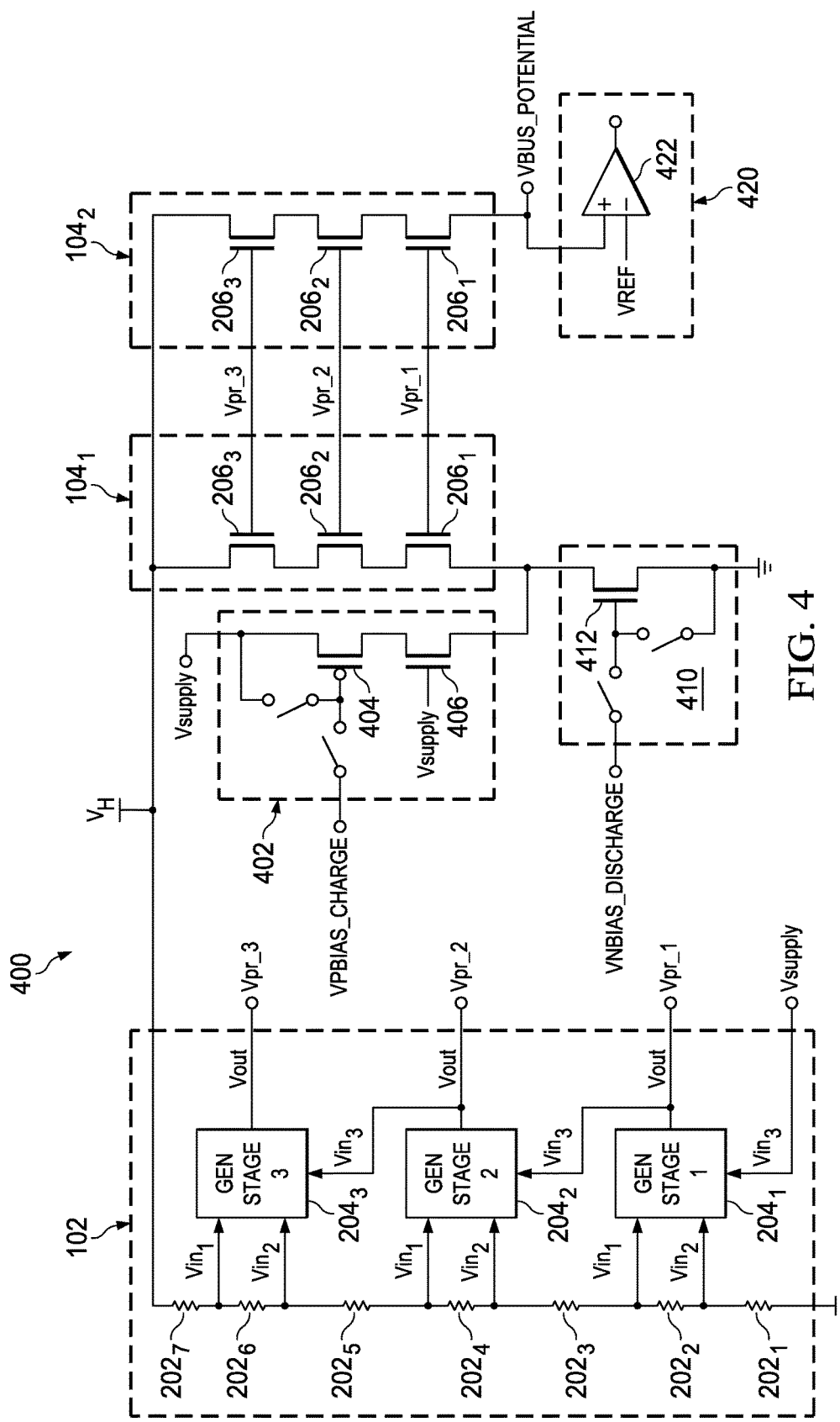
FIG. 4 is a schematic diagram of a voltage protection circuit in accordance with another embodiment.

FIG. 4 is a schematic diagram of a voltage protection circuit 400 in accordance with another embodiment. This voltage protection circuit 400 is similar to the voltage protection circuit 100 described above except that it has seven resistors 202 in the resistor ladder, three protection voltage generation stages 204, three NMOS transistors 206 in each of the cascode ladders 104, two cascode ladders 104, and low voltage circuits 402, 410, and 420.

In this specific embodiment, the low voltage circuits 402, 410, and 420 implement the USB On-The-Go (OTG) and Embedded Host standard. The USB OTG and Embedded Host standard version 2 was introduced in a supplement to the USB 2.0 specification and included a new communication protocol called Attach Detection Protocol (ADP). The USB OTG protocol and ADP are described in the USB Revision 2.0 Specification which is incorporated herein in its entirety.

ADP allows an OTG device, embedded host or USB device to determine attachment status in the absence of power on the USB VBUS pin/line. This enables both insertion based behavior and the possibility for a device to display attachment status. It does this by periodically measuring the capacitance on the USB port to determine the status of the USB port, such as is another device attached, is there a dangling cable, or is there no cable. When a change in capacitance, large enough to indicate device attachment is detected then an A-device will provide power to the USB VBUS and look for device connection. A B-device will generate a session request protocol and wait for the USB VBUS to become powered.

In the illustrated embodiment in FIG. 4, the voltage $V_H$ is the USB VBUS and the USB VBUS can be up to 6 V when a device is attached and can be about 0 V when there is no device attached. When there is no device attached and the circuit is in ADP mode, the USB VBUS ($V_H$) is periodically charged from about 0 V to about 0.75 V and then discharged back to about 0V. A sense circuit can detect a change in the USB VBUS voltage during the charging, while charged, and during discharging to indicate a device attachment. In the illustrated embodiment, a charging circuit 402 can charge the USB VBUS ($V_H$), a discharging circuit 410 can discharge the USB VBUS, and a sensing circuit 420 can sense changes in the USB VBUS voltage. The circuits 402, 410, and 420 are examples of the low voltage circuits/devices 106 (see FIGS. 1 and 2) that need protection of the cascode ladders 104.

The charging circuit 402 includes a PMOS transistor 404 in series with an NMOS transistor 406 and both transistors are coupled between voltage Vsupply and the source terminal of the lowest NMOS transistor $206_1$ in the cascode ladder $104_1$. The PMOS transistor 404 has a VPBIAS_CHARGE signal that is an analog bias voltage coupled to the gate of the transistor 404, by a switch (see FIG. 4), which acts a current source when the circuit 400 is in ADP mode and the USB VBUS is to be charged. The NMOS transistor 406 has voltage Vsupply coupled to its gate which provides protection to the PMOS transistor 404 and Vsupply from the voltage on the USB VBUS when the Vsupply is absent or at about 0 V.

The discharging circuit 410 includes a NMOS transistor 412 coupled between the source terminal of the lowest NMOS transistor $206_1$ in the cascode ladder $104_1$ and ground. The NMOS transistor 412 has a VNBIAS_DISCHARGE signal that is an analog bias voltage coupled to the gate of the transistor 412, by a switch (see FIG. 4), which acts as a current sink when the circuit 400 is in ADP mode and the USB VBUS is to be discharged by coupling the source terminal of the lowest NMOS transistor $206_1$ to ground.

The sensing circuit 420 includes comparator 422 such as an operation amplifier 422. The comparator 422 senses a difference between the voltage VBUS_POTENTIAL at the source terminal of the lowest NMOS transistor $206_1$ in the cascode ladder $104_2$ and a reference voltage (VREF). As illustrated the voltage VBUS_POTENTIAL is coupled to the non-inverting input of operational amplifier 422 and VREF is coupled to the inverting input of the operational amplifier 422 with the output of the operational amplifier indicating the detection of a device attachment.

Figure 5A:
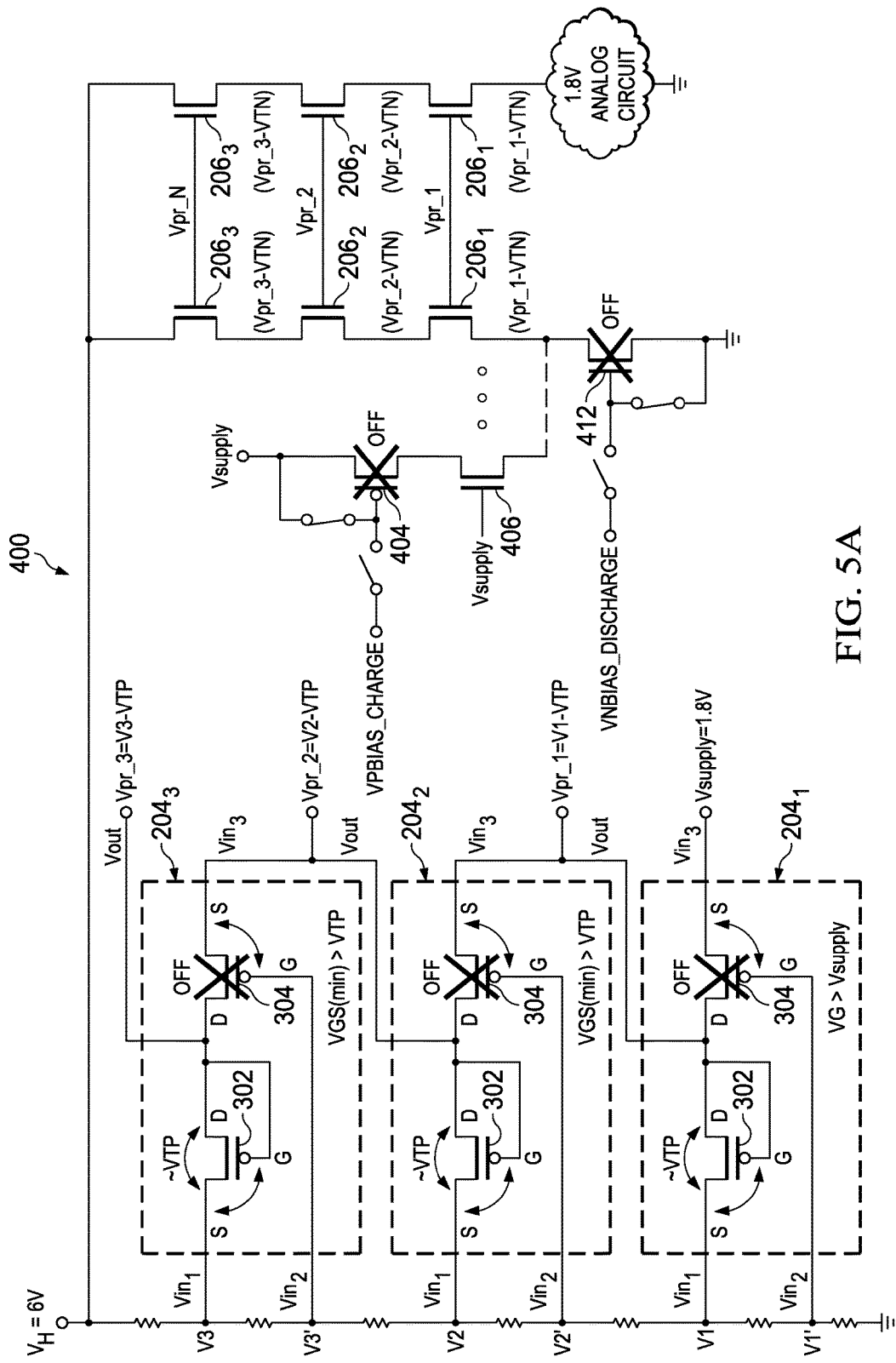
FIGS. 5A, 5B, and 5C are schematic diagrams of the operation of the voltage protection circuit in FIG. 4 in accordance with an embodiment.
Figure 5B:
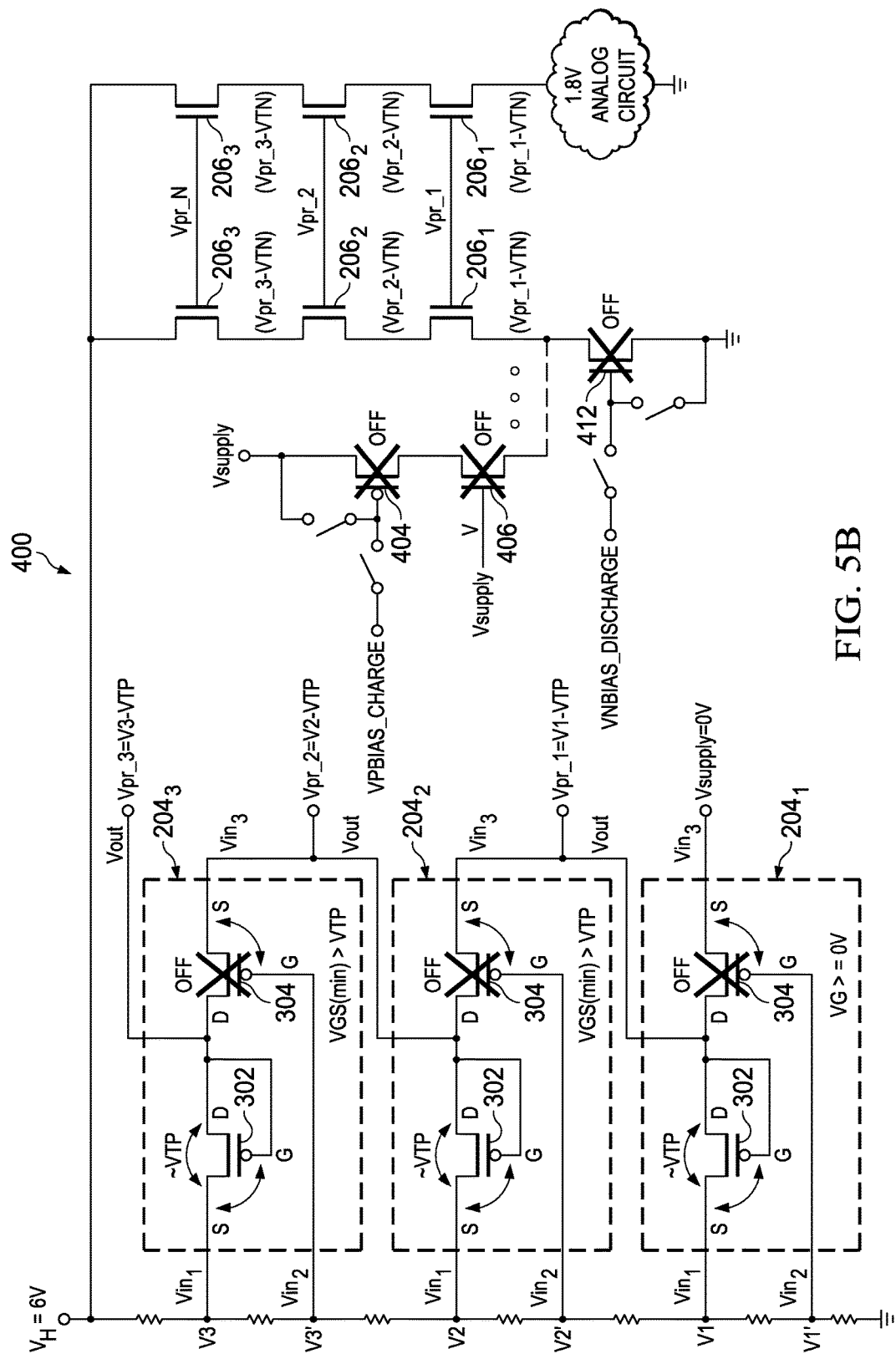
Figure 5C:
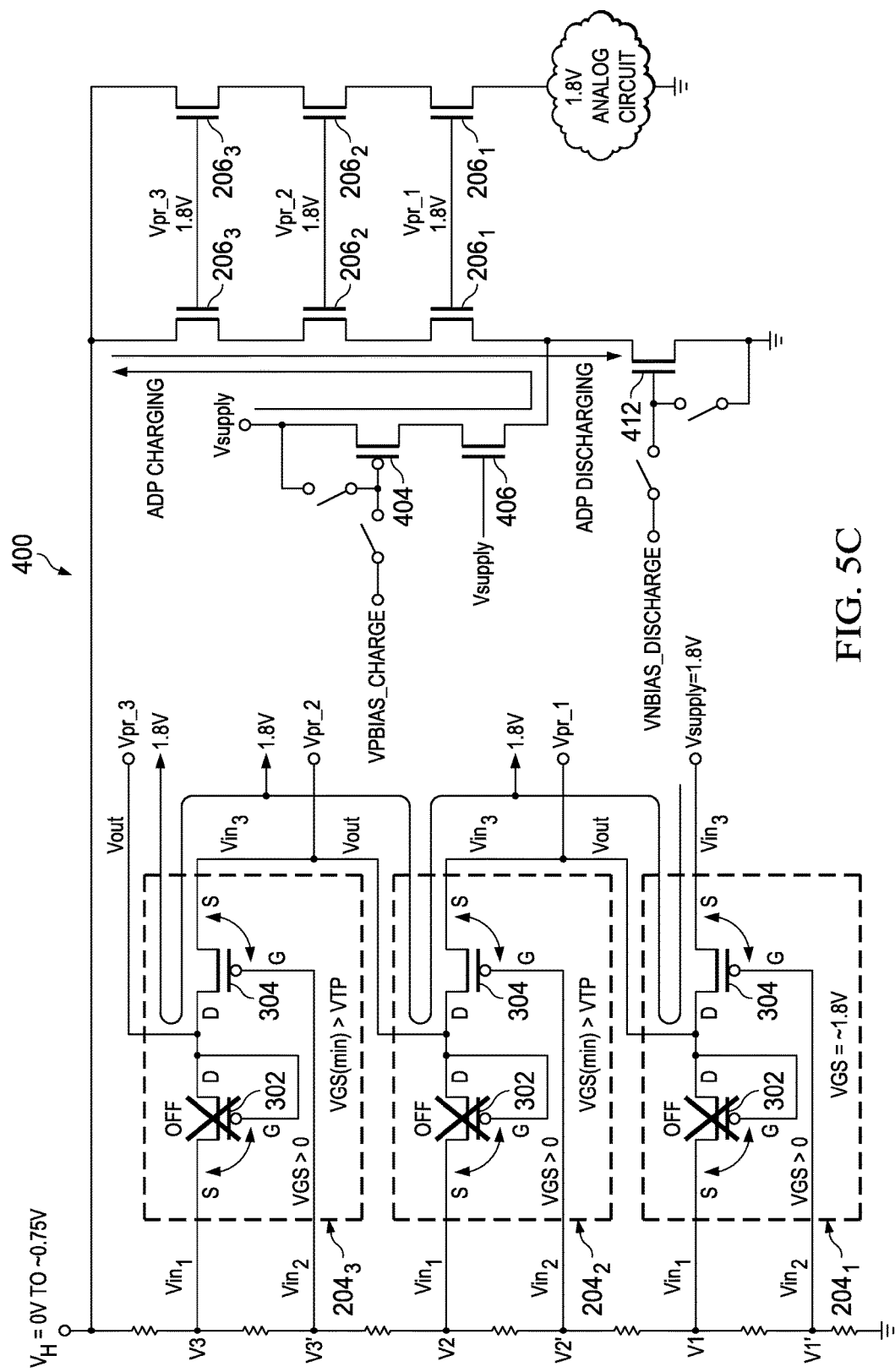

FIGS. 5A, 5B, and 5C are schematic diagrams of the operation of the voltage protection circuit 400 in FIG. 4 in accordance with an embodiment. FIG. 5A illustrates the operation of the voltage protection circuit 400 in a normal state (non-ADP mode) with a USB VBUS voltage of about 6 V and a Vsupply of about 1.8 V. The resistor ladder has voltage taps V1, V2, and V3 at the inputs Vin1 of the stages $204_1$, $204_2$, and $204_3$, respectively, and voltage taps V1', V2', and V3' at the inputs Vin2 of the stages $204_1$, $204_2$, and $204_3$, respectively. The protection voltage generation stages 204 are illustrated as the embodiment in FIG. 3A, although any suitable embodiment for the protection voltage generation stages 204 can be utilized. Because the voltage protection circuit 400 is in a non-ADP mode, the VPBIAS_CHARGE signal is a high voltage and VNBIAS_DISCHARGE is a low voltage to put the transistors 404 and 412 of the charging circuit 402 and discharging circuit 410, respectively, in OFF states.

In this embodiment, the resistor ladder and the voltage Vsupply are configured such that the gates of the PMOS transistors 304 of the protection voltage generation stages 204 are at higher voltages than their respective sources, so that the PMOS transistors 304 are in OFF states. In order for the protection voltages Vpr to be properly generated the voltage V1 should be greater than or equal to Vsupply+VTP, V2 should be greater than or equal to Vpr_1+VTP, and V3 should be greater than or equal to Vpr_2+VTP. In this embodiment, another set of conditions to properly generate the protection voltages Vpr is that V1' is greater than (V1−(2*VTP)), V2' is greater than (V2−(2*VTP)), and V3' is greater than (V3−(2*VTP)).

If the voltage taps (V1, V2, and V3) of the resistor ladder are configured as described above, the outputs Vout of the stages 204 are cascaded up to the next stage 204 as the input Vin3 of the next stage 204. The drains of the PMOS transistors 304 are at a voltage equal to the voltage tap at the respective inputs Vin1 minus the threshold voltage (VTP) of the respective PMOS transistor 302. Hence, output Vout of stage $204_1$=Vpr_1=V1−VTP, output Vout of stage $204_2$=Vpr_2=V2−VTP, and output Vout of stage $204_2$=Vpr_3=V3−VTP. Thus, the protection voltages Vpr increase from Vpr_1 to Vpr_3 and provide protection voltages Vpr to the gates of the NMOS transistors 206 of the cascode ladders to allow them to safely drop the voltage VH to a voltage suitable for the low voltage circuits coupled to the lower stages of the cascode ladders.

In some embodiments, the maximum rating for each of NMOS transistors 206 and the PMOS transistors 302 and 304 are about 1.98 V. In these embodiments, $V_H$−Vpr_3 is less than or equal to 1.98 V, Vpr_3−Vpr_2 is less than or equal to 1.98 V, and Vpr_2−Vpr_1 is less than or equal to 1.98 V to stay at or under the maximum rating the NMOS transistors 206. In addition, V3−V2 is less than 1.98 V, V2−V1 is less than 1.98 V, and V1−VTP is less than 1.98 V.

FIG. 5B illustrates the operation of the voltage protection circuit 400 in a normal state (non-ADP mode) with a USB VBUS voltage of about 6 V and a Vsupply of about 0 V. The operation of this configuration is similar to FIG. 5A except that the NMOS transistor 406 is turned off because the Vsupply is 0 V. The protection voltages Vpr and the stages 204 operate in a similar manner as described above in FIG. 5A. Hence, the operation of the protection voltage generation circuit 102 (see FIGS. 1 and 2) operates independent of the supply voltage Vsupply.

FIG. 5C illustrates the operation of the voltage protection circuit 400 in a low power state (ADP mode) with a USB VBUS voltage from about 0 V to about 0.75 V and a Vsupply of about 1.8 V. In this embodiment, because the USB's VBUS voltage is a low voltage, the voltages at the sources of the PMOS transistors 302 of the stages 204 are less than the voltages at their respective gates and drains, and thus, the PMOS transistors 302 are in an OFF state. In addition, because the max USB VBUS voltage is about 0.75 V, all of the voltage taps (V1, V1', V2, V2', V3, and V3') are less than the voltage Vsupply by more VTP, and thus, the transistors 304 of the stages 204 are in ON states. This allows the voltage Vsupply to propagate up through each of the stages 204 such that each of the protection voltages Vpr (Vpr_1, Vpr_2, and Vpr_3) are equal to the voltage Vsupply.

The signals VPBIAS_CHARGE and VNBIAS_DISCHARGE are coupled to the current source transistor 404 and the sink transistor 412 for charging and discharging, respectively, during ADP mode. The ADP charging occurs at different times than the ADP discharging, e.g., the ADP charging and ADP discharging operations are mutually exclusive and do not happen simultaneously. For example, for a charging operation the VPBIAS_CHARGE signal coupled to the gate of transistor 404 by the switch at the gate of transistor 404 and the VNBIAS_DISCHARGE is not coupled to the gate of transistor 412 by the switch at the gate of the transistor 412, which couples the voltage Vsupply to the lower stage of the cascode ladder while the USB VBUS is at about 0V. Thus, the source and drain terminals of the NMOS transistors 206 of the cascode ladders are effectively reversed because Vsupply is a higher voltage than voltage $V_H$, which allows voltage Vsupply to charge the USB VBUS as illustrated in FIG. 5C.

For a discharging operation the VPBIAS_DISCHARGE signal is coupled to the gate of transistor 412 by the switch at the gate of the transistor 412 and the VNBIAS_CHARGE is not coupled to the gate of transistor 404 by the switch at the gate of transistor 404, which couples the lower stage of the cascode ladder to ground. This discharges the USB VBUS to ground as illustrated in FIG. 5C.

Figure 6D:
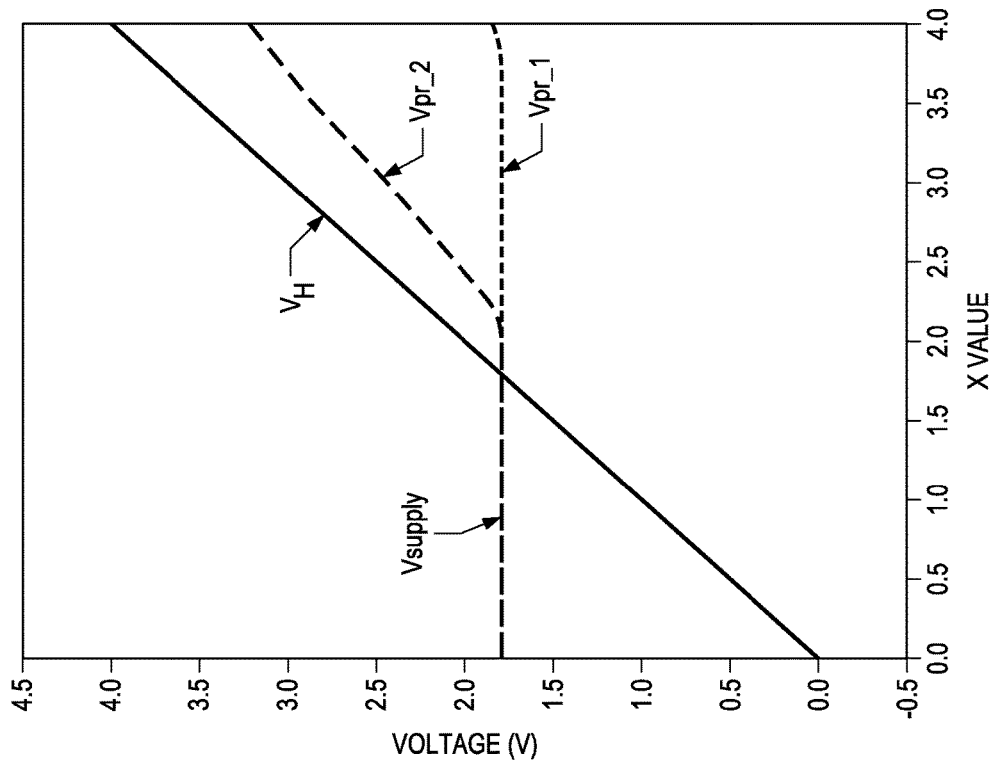
Figure 6C:
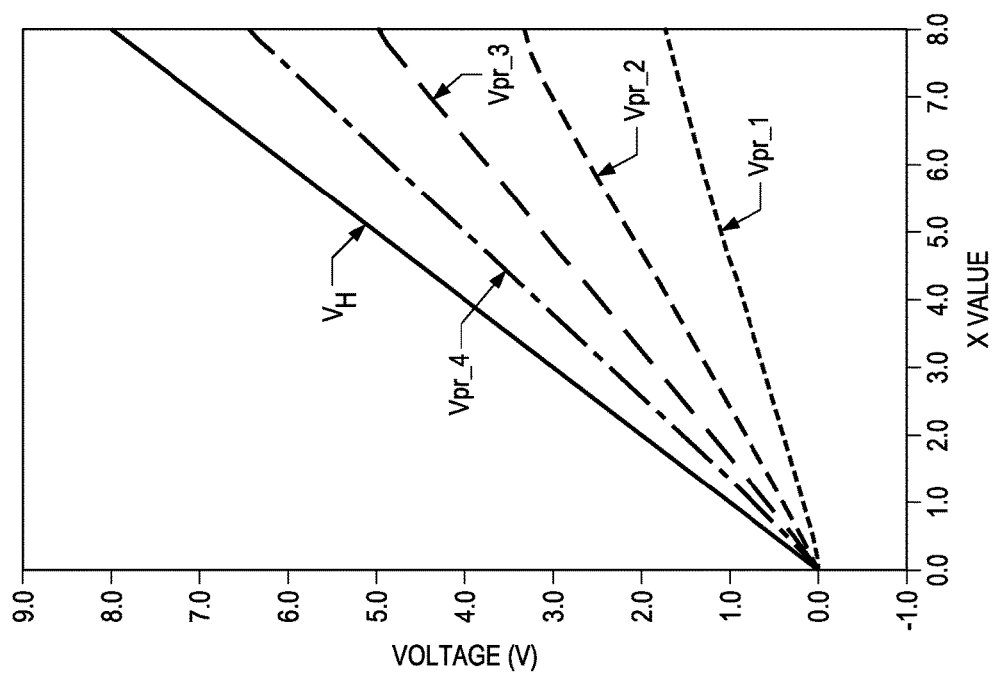

FIGS. 6A-F illustrate the behavior of protection voltages with increasing voltages $V_H$ from 0 V to its maximum designed voltages of 4 V, 6 V, and 8 V, respectively, in accordance with various embodiments. FIGS. 6A-C illustrate the generation of protection voltages Vpr in relation to the voltage $V_H$ (e.g. USB VBUS voltage) when the Vsupply is absent or about 0 V. In FIG. 6A, there are two stages 204 and two protection voltages Vpr (Vpr_1 and Vpr_2) and the max voltage $V_H$ is about 4 V. In FIG. 6B, there are three stages 204 and three protection voltages Vpr (Vpr_1, Vpr_2, and Vpr_3) and the max voltage $V_H$ is about 6 V. In FIG. 6C, there are four stages 204 and four protection voltages Vpr (Vpr_1, Vpr_2, Vpr_3, Vpr_4) and the max voltage $V_H$ is about 8 V. In the embodiments in FIGS. 6A-C, the maximum voltage rating of the devices is about 1.98 V.

Figure 6E:
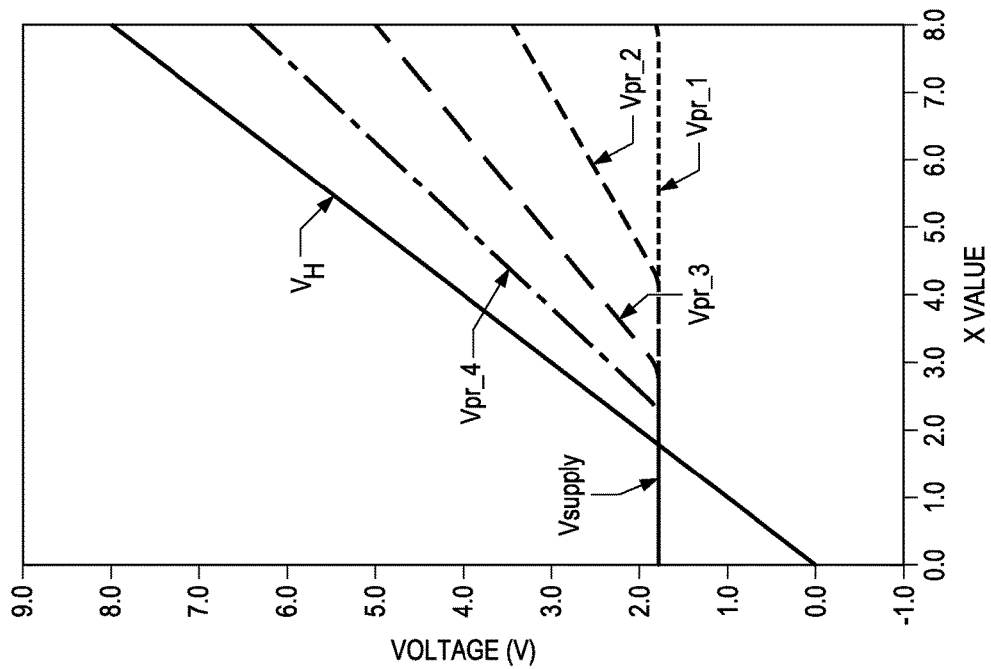
Figure 6F:
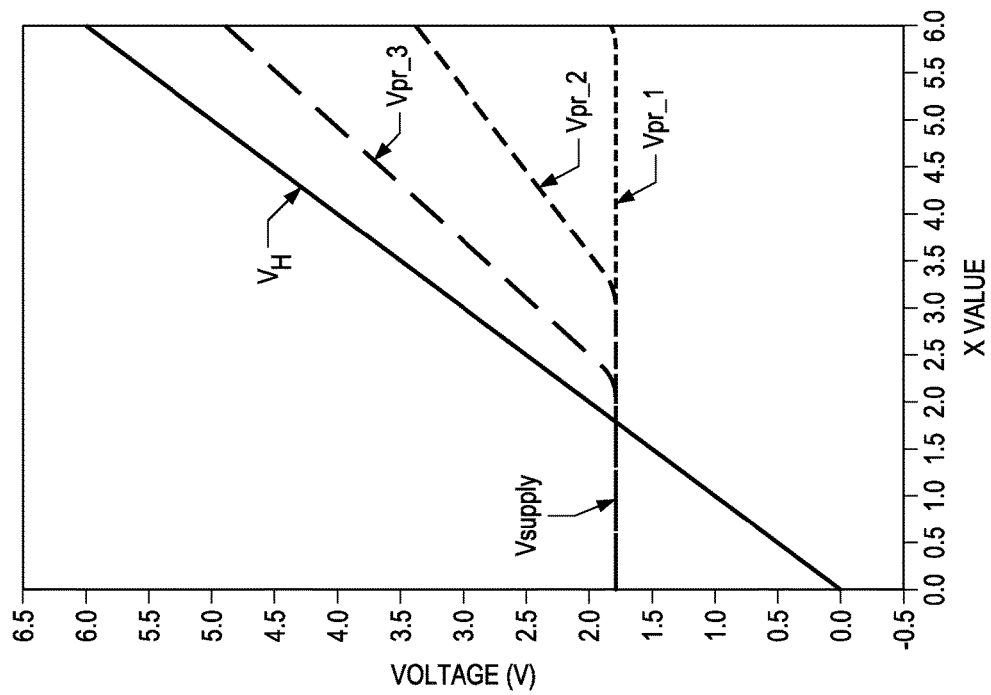

FIGS. 6D-F illustrate the behavior of protection voltages Vpr in relation to increasing voltages $V_H$ (e.g. USB VBUS voltage) when the Vsupply is about 1.8 V. In FIG. 6D, there are two stages 204 and two protection voltages Vpr (Vpr_1 and Vpr_2) and the max voltage $V_H$ is about 4 V. In FIG. 6E, there are three stages 204 and three protection voltages Vpr (Vpr_1, Vpr_2, and Vpr_3) and the max voltage $V_H$ is about 6 V. In FIG. 6F, there are four stages 204 and four protection voltages Vpr (Vpr_1, Vpr_2, Vpr_3, Vpr_4) and the max voltage $V_H$ is about 8 V. In the embodiments in FIGS. 6A-C, the maximum voltage rating of the devices is about 1.98 V. In FIGS. 6D-F, the protection voltages Vpr start at the value of the voltage Vsupply (e.g. about 1.8 V).

As illustrated in FIGS. 6A-F, none of the stages of the cascode ladder has to drop more than the maximum voltage rating of 1.98 V, and thus, the voltage protection circuit 100 can utilize low voltage devices while still scaling to accommodate the various max voltages (e.g. 4 V, 6 V, and 8 V).

According to various embodiments described herein, advantages include having a scheme to generate voltages to protect internal circuitry. In particular, the present disclosure utilizes one set of voltages to generate reference voltages to protect low voltage circuity from the one set of voltages. This allows for high voltage signal handling using low voltage capable devices, such as low voltage MOSFETs. In addition, this disclosure provides for supply independent high voltage protection for the low voltage circuitry.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A circuit comprising:
a protection voltage generator comprising a resistor ladder and a plurality of generator stages, the protection voltage generator coupled to a first voltage node, a second voltage node, and a ground voltage node, the protection voltage generator configured to generate a plurality of protection voltages at a first plurality of nodes based on the first voltage node and the second voltage node, each of the generator stages configured to generate one of the plurality of protection voltages, each of the generator stages having a first input, a second input, and a third input, the first input and a second input coupled to a first voltage tap and a second voltage tap of the resistor ladder, respectively; and
a voltage protection ladder coupled between the first voltage node and a low voltage circuit, the voltage protection ladder coupled to the plurality of protection voltages at the first plurality of nodes, the voltage protection ladder configured to generate a first low voltage based on the first voltage node and the plurality of protection voltages.

2. The circuit of claim 1, wherein a first generator stage of the plurality of generator stages has the third input coupled to the second voltage node, and wherein a second generator stage of the plurality of generator stages has the third input coupled to an output of the first generator stage.

3. The circuit of claim 1, wherein each of the plurality of generator stages further comprise:
a first p-type metal-oxide-semiconductor field-effect transistor (PMOS transistor) having a source terminal coupled to the first voltage tap of the resistor ladder and a gate terminal coupled to a drain terminal of the first PMOS transistor; and
a second PMOS transistor having a drain terminal coupled to the drain terminal of the first PMOS transistor, a source terminal coupled to the third input, and a gate terminal coupled to the second voltage tap of the resistor ladder.

4. The circuit of claim 1, wherein each of the plurality of generator stages further comprise:
a first n-type metal-oxide-semiconductor field-effect transistor (NMOS transistor) having a drain terminal coupled to the first voltage tap of the resistor ladder and a gate terminal coupled to drain terminal of the first NMOS transistor; and
a first PMOS transistor having a drain terminal coupled to a source terminal of the first NMOS transistor, a source terminal coupled to the third input, and a gate terminal coupled to the second voltage tap of the resistor ladder.

5. The circuit of claim 1, wherein each of the plurality of generator stages further comprise:
a diode having an anode terminal coupled to the first voltage tap of the resistor ladder; and
a first PMOS transistor having a drain terminal coupled to a cathode terminal of the diode, a source terminal coupled to the third input, and a gate terminal coupled to the second voltage tap of the resistor ladder.

6. The circuit of claim 1, wherein the first voltage node is a first voltage signal, the second voltage node is a second voltage signal, the second voltage signal being a positive voltage and being less than the first voltage signal, and wherein each of the plurality of protection voltages are different voltages between the first voltage signal and the second voltage signal.

7. The circuit of claim 6, wherein a difference between adjacent voltages of the plurality of protection voltages is substantially equal to the second voltage signal.

8. The circuit of claim 6, wherein the first voltage signal is about 6 volts and the second voltage signal is about 1.8 volts.

9. The circuit of claim 1, wherein the first voltage node is a first voltage signal, the second voltage node is a second voltage signal, the second voltage signal being a positive voltage and being greater than the first voltage signal, and wherein each of the plurality of protection voltages are substantially equal to the second voltage signal.

10. The circuit of claim 1, wherein the voltage protection ladder further comprises a plurality of cascode devices serially coupled between the first voltage node and the low voltage circuit, each of the cascode devices having a gate coupled to one of the plurality of protection voltages.

11. The circuit of claim 10, wherein each of the cascode devices is a low voltage n-type metal-oxide-semiconductor field-effect transistor (NMOS transistor).

12. The circuit of claim 1, wherein the low voltage circuit comprises a charging circuit, a discharging circuit, and a sense circuit, the charging circuit, the discharging circuit, and the sense circuit are configured to detect Universal Serial Bus (USB) device attachment and detachment to and from the first voltage node.

13. A circuit comprising:
a resistor ladder comprising M number of resistors serially coupled between a first power supply voltage and a ground voltage;
a bias generator circuit comprising N number of bias voltage generators having inputs coupled to the resistor ladder, the bias voltage generators configured to generate N number of bias voltages at their outputs, wherein N−1 of the bias voltage generators have their output coupled to the input of another bias voltage generator, wherein the bias generator circuit comprises:
a first bias voltage generator having a first input and a second input coupled to separate nodes on the resistor ladder and a third input coupled to a second power supply voltage, the second power supply voltage being different than the first power supply voltage;
a second bias voltage generator having a first input and a second input coupled to separate nodes on the resistor ladder and a third input coupled to an output of the first bias voltage generator; and
a third bias voltage generator having a first input and a second input coupled to separate nodes on the resistor ladder and a third input coupled to an output of the second bias voltage generator; and
a cascode ladder comprising N number of cascode devices serially coupled between the first power supply voltage and a low voltage device, each of the cascode devices being coupled to one of the bias voltages.

14. The circuit of claim 13, wherein each of the cascode devices comprises an n-type metal-oxide-semiconductor field-effect transistor (NMOS transistor).

15. The circuit of claim 13, wherein M=2N+1.

16. The circuit of claim 13, wherein the first power supply voltage is greater than the second power supply voltage, the bias voltage generated by the third bias voltage generator being greater than the bias voltage generated by the second bias voltage generator, the bias voltage generated by the second bias voltage generator being greater than the bias voltage generated by the first bias voltage generator.

17. The circuit of claim 13, wherein the first power supply voltage is less than the second power supply voltage, the bias voltages generated by the first, the second, and the third bias voltage generators being substantially equal.

18. The circuit of claim 17, wherein the bias voltages generated by the first, the second, and the third bias voltage generators are substantially equal to the second power supply voltage.

19. A method comprising:
dividing a first supply voltage into a first set of voltages;
generating a plurality of protection voltages, a first protection voltage of the plurality of protection voltages based on two of the first set of voltages and a second supply voltage, the other protection voltages of the plurality of the protection voltages each based on two of the first set of voltages and one of the other protection voltages of the plurality of protection voltages, wherein when the second supply voltage is greater than the first supply voltage, the plurality of protection voltages are substantially equal; and
generating a first low voltage from the first supply voltage based on the plurality of protection voltages.

20. The method of claim 19, wherein each of the plurality of protection voltages is generated based on a different two of the first set of voltages.

21. The method of claim 19, wherein the generating a first low voltage from the first supply voltage based on the plurality of protection voltages further comprises dropping the first supply voltage with a plurality of cascode devices serially connected between the first supply voltage and the first low voltage, each of the cascode devices being coupled to one of the plurality of protection voltages.

22. The method of claim 21, wherein each of the cascode devices comprises an n-type metal-oxide-semiconductor field-effect transistor (NMOS transistor) with a gate terminal coupled to one of the plurality of protection voltages.

23. The method of claim 19, wherein when the second supply voltage is less than the first supply voltage, each of the plurality of protection voltages is a different voltage value.

24. The method of claim 19, wherein when the second supply voltage is greater than the first supply voltage, the second supply voltage and the plurality of protection voltages are substantially equal.

* * * * *